United States Patent [19]

Flemming et al.

[11] Patent Number: 4,818,930
[45] Date of Patent: Apr. 4, 1989

[54] METHOD AND APPARATUS FOR THIN LAYER MONITORING

[75] Inventors: Michael A. Flemming, Radley Green; Graham N. Plested, Didcot, both of United Kingdom

[73] Assignee: United Kingdom Atomic Energy Authority, London, England

[21] Appl. No.: 104,357

[22] Filed: Oct. 5, 1987

[30] Foreign Application Priority Data

Nov. 12, 1986 [GB] United Kingdom ............... 8627073
Apr. 1, 1987 [GB] United Kingdom ............... 8707797

[51] Int. Cl.$^4$ .......................................... G01R 27/04
[52] U.S. Cl. ............................................. 324/58.5 B
[58] Field of Search .......... 324/58.5 B, 58.5 R, 324/58 B, 58 R

[56] References Cited

U.S. PATENT DOCUMENTS 4,052,666 10/1977 Fletcher et al. ............... 324/58.5 B
4,707,652 11/1987 Lowitz ......................... 324/58.5 B Primary Examiner—Reinhard J. Eisenzopf
Assistant Examiner—Walter E. Snow
Attorney, Agent, or Firm—William R. Hinds

[57] ABSTRACT

An apparatus and a method are provided for measuring the thickness (d) of a thin layer (12) of a non-metallic material on the surface of another medium (14). A transmitter (16) causes a beam of microwaves to be incident on the exposed surface (15) at an angle of incidence greater than 30°, and at least one fixed detector (18) monitors a component of the reflected microwave beam polarized in an appropriate plane. In one case the angle of incidence is equal to the Brewster angle (B) for the lower medium, which is water, and the detector monitors the amplitude of the vertically plane polarized component, which is a rapidly varying function of the thickness. In another case the angle of incidence is about 45°, and the monitored component is cross-polarized relative to the incident beam. The apparatus is suitable for detecting layers less than 1 mm thick of pollutants such as oil or kerosene on water before such water is discharged into the environment.

11 Claims, 4 Drawing Sheets

METHOD AND APPARATUS FOR THIN LAYER MONITORING

This invention relates to a method and an apparatus for detecting and measuring the thickness of a layer of a material on a surface of another medium, particularly but not exclusively a layer of a non-aqueous liquid floating on an aqueous liquid.

It is known to use ultrasonic techniques for measuring the thickness of liquid layers, European patent application EP No. 0 167 338 A describing one suitable type of ultrasonic equipment. However, ultrasonic techniques are not usually satisfactory if the layer is much less than about 10 mm thick. In view of the importance of avoiding pollution of the environment it is desirable to be able to detect much thinner layers, say 1 mm or less, of organic liquids such as oil, petrol or kerosene, floating on water, before such water is discharged into the environment.

It is also known to use optical ellipsometry to measure the thickness of very thin layers whose thickness is less than the wavelength of light; and a similar technique using microwaves of wavelength down to 0.3 mm has been described by V. A. Konev et al. (Izmeritel'naya Tekhnika, No 10, October 1984, and translated by Plenum Publishing Corp, in 1985), to measure the thickness of metallic coatings on a dielectric substrate, where the coatings are less than about 0.1 micrometers thick. A vegetation sensing technique is described in U.S. Pat. No. 4,052,666 (Fletcher et al.) in which circularly polarized microwaves are transmitted from a satellite toward vegetation; reflected microwaves are detected, both horizontally and vertically plane polarized components being monitored. From the ratio and also the phase difference between the two components a computer can calculate parameters of the vegetation and the soil. A comparatively simple, non-contact technique for measuring thin films about 0.1 mm thick or even thicker of a material which may be a dielectric would be desirable.

According to the present invention there is provided a method for monitoring a continuous layer of a non-metallic material of thickness greater than about 25 micrometres and less then about 10 mm on a surface of another medium, the method comprising causing a beam of microwaves to be incident on the exposed surface of the layer at an angle of incidence greater than about 30°, the incident beam having a non-zero vertically plane-polarized component, and monitoring at least one component of the reflected beam polarized in a preset appropriate plane, or monitoring two such components and determining either their ratio or their phase difference.

The material may be a non-aqueous liquid and the other medium water. Water has a very high dielectric constant (relative permittivity) in the microwave region of the spectrum, for example that of pure water at 10 GHz is about 55, and generally gives a large reflection coefficient. However for vertically plane-polarized microwaves at an angle of incidence equal to the Brewster angle, there is a null in the reflection coefficient. The reflection coefficient, especially near the Brewster angle, is markedly changed by the presence of a thin layer of another liquid such as kerosene on the surface, because such liquids consist of non-polar molecules and so have much smaller values o dielectric constant (about 2 at 10 GHz), and the amplitude of the vertically plane-polarized component varies significantly with the thickness of the layer. Hence the monitored component may be the vertically plane-polarized component, and the angle of incidence be near the Brewster angle for the other medium.

By vertically plane-polarized is meant that the microwaves are plane-polarized with the electric vector in the plane containing the incident beam and the normal to the surface of the liquid; waves polarized with the electric vector in a plane parallel to the surface are said to be horizontally plane-polarized. The Brewster angle is the angle whose tangent is equal to the refractive index of the medium.

At other angles of incidence there is much less variation in the amplitude of the reflected horizontally and vertically plane-polarized components with the layer thickness, but there is a phase difference between these components which varies significantly with the layer thickness, and this phase difference may be measured directly or indirectly. So, alternatively, the incident beam may be plane-polarized with a non-zero horizontally plane-polarized component and the monitored component be a component plane-polarized at about 90° to the polarization of the incident beam, the angle of incidence desirably being between about 45° and 70°. In this latter case the incident beam is preferably plane-polarized at +45° and the monitored component is that polarized at −45°; the monitored component will only be non-zero if there is a phase difference between the vertically and horizontally plane polarized components due to the reflection, assuming the vertically and horizontally plane-polarized components remain equal in magnitude.

The microwaves are desirably in the frequency range about 2 GHz to 20 GHz and hence of wavelength between about 150 mm and 15 mm; the preferred frequency is about 10 GHz. If the thickness of the liquid layer is greater than a few millimetres, that is a fraction of the wavelength, then there is an ambiguity in the measured value of thickness; for monitoring thick layers this ambiguity may be resolved by using two microwave beams of different frequency (and wavelength), or by modulating the frequency of the incident microwave beam and observing the magnitude of the consequent fluctuations in the monitored reflected beam.

In a first method of operation, a beam of microwaves having approximately equal horizontally and vertically plane-polarized components is arranged to be incident on the surface, at within about 2° of the Brewster angle, and the amplitudes of the horizontally and vertically plane-polarized components of the reflected beam are then compared. For water, the Brewster angle is about 82°. In a second method of operation, a beam of microwaves having approximately equal horizontally and vertically plane-polarized components is arranged to be incident on the surface at an angle of incidence of about 60° and the amplitude of the component of the reflected beam cross-polarized with respect to the incident beam is measured. In a third method of operation the incident beam is as described in relation to the second method, but the horizontally and vertically plane-polarized components of the reflected beam are both detected and the phase difference between them is measured electronically.

The latter two methods have two advantages: because the incident and reflected beams are not as far from the normal, there is less likelihood of microwaves from the source reaching the receiver without having undergone the reflection, and slight fluctuations in the level of the liquid surface have a smaller effect on the incident angle. Furthermore the latter two methods can be applied where the material is a film or sheet of a dielectric material which may be solid, and the other medium is a metal.

The invention also provides an apparatus for performing the method, the apparatus comprising means for causing a beam of microwaves to be incident on the surface at an angle of incidence greater than about 30°, the incident beam having a non-zero vertically plane-polarized component, and means for monitoring the amplitude of a component of the reflected microwave beam polarized in an appropriate plane.

The invention will now be further described by way of example only and with reference to the accompanying drawings in which.

Figure 1:
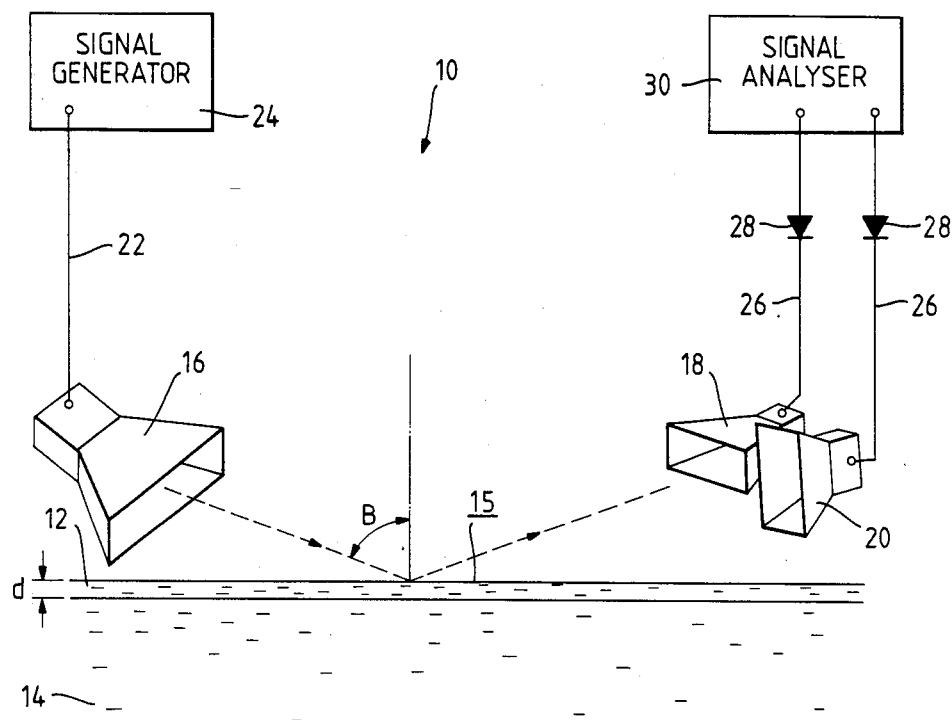
FIG. 1 shows a diagrammatic partly perspective view of an apparatus for monitoring the thickness of a liquid layer on the surface of water.
Figure 3:
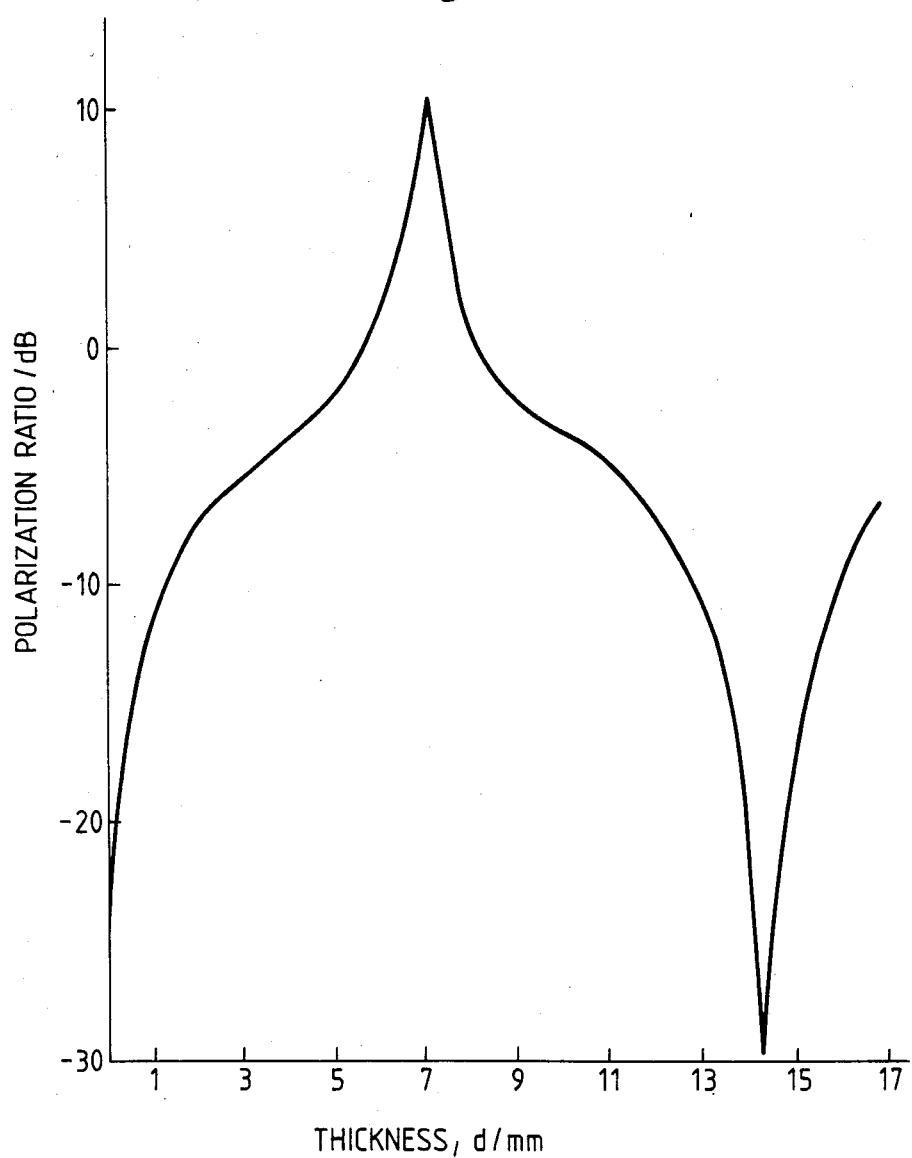
Figure 4:
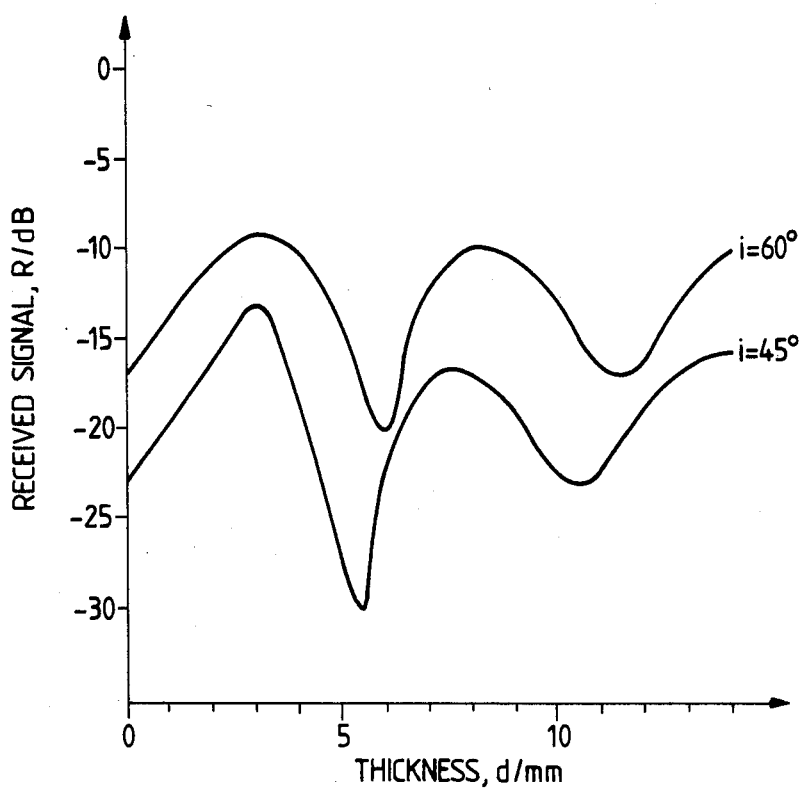

FIG. 3 represents graphically the variation of the polarization ratio (the ratio of the amplitudes of the vertically and horizontally plane-polarized reflected microwaves) as a function of the thickness of the kerosene layer, for the apparatus of FIG. 1; and FIG. 4 represents graphically the variation in received signal as a function of the thickness of a kerosene layer on the surface of water for an alternative monitoring apparatus.

Referring to FIG. 1, there is shown an apparatus 10 for monitoring the thickness d of a layer of kerosene 12 on the surface of water 14. The apparatus 10 includes a transmitting horn 16 and two high-gain receiving horns 18 and 20. The transmitting horn 16 is connected by a coaxial cable 22 to a signal generator 24 which produces an 11 GHz signal, amplitude modulated by a 1 kHz square wave, and the horn 16 is arranged so as to transmit a beam of microwaves onto the exposed liquid surface 15 at an angle of incidence of the Brewster angle B for a pure water/air interface, and with its plane of polarization at about 45° to the vertical so that the incident beam has approximately equal horizontally and vertically polarized components. At a frequency of 11 GHz the Brewster angle for pure water is about 82°; however owing to the divergence of the microwave beam, the angle of incidence inevitably varies by several degrees over the width of the beam at the surface 15.

The receiving horns 18 and 20 are arranged next to each other so that both receive microwaves emitted by the horn 16 after reflection from the surface 15. One horn 18 is arranged to receive vertically polarized microwaves and the other horn 20 to receive horizontally polarized microwaves. Each horn 18 and 20 is connected by a respective coaxial cable 26 and a respective crystal detector 28 (such as Hewlett Packard 423A) to a common amplifier-and-signal-analysis unit 30. The unit 30 amplifies and then compares the amplitudes of the signals received from the receiving horns 18 and 20, which represent the vertically and horizontally polarized components of the reflected microwave beam, so determining the value of the polarization ratio. The thickness d may be determined, as explained below, from the value of the polarization ratio.

The horns 16, 18 and 20 may be mounted on a support member (not shown) which floats on the water 14, to ensure that the angle of incidence is not affected by any changes in liquid level. This is of course not necessary where the liquid level is arranged not to fluctuate (for example by an overflow system).

Figure 2:
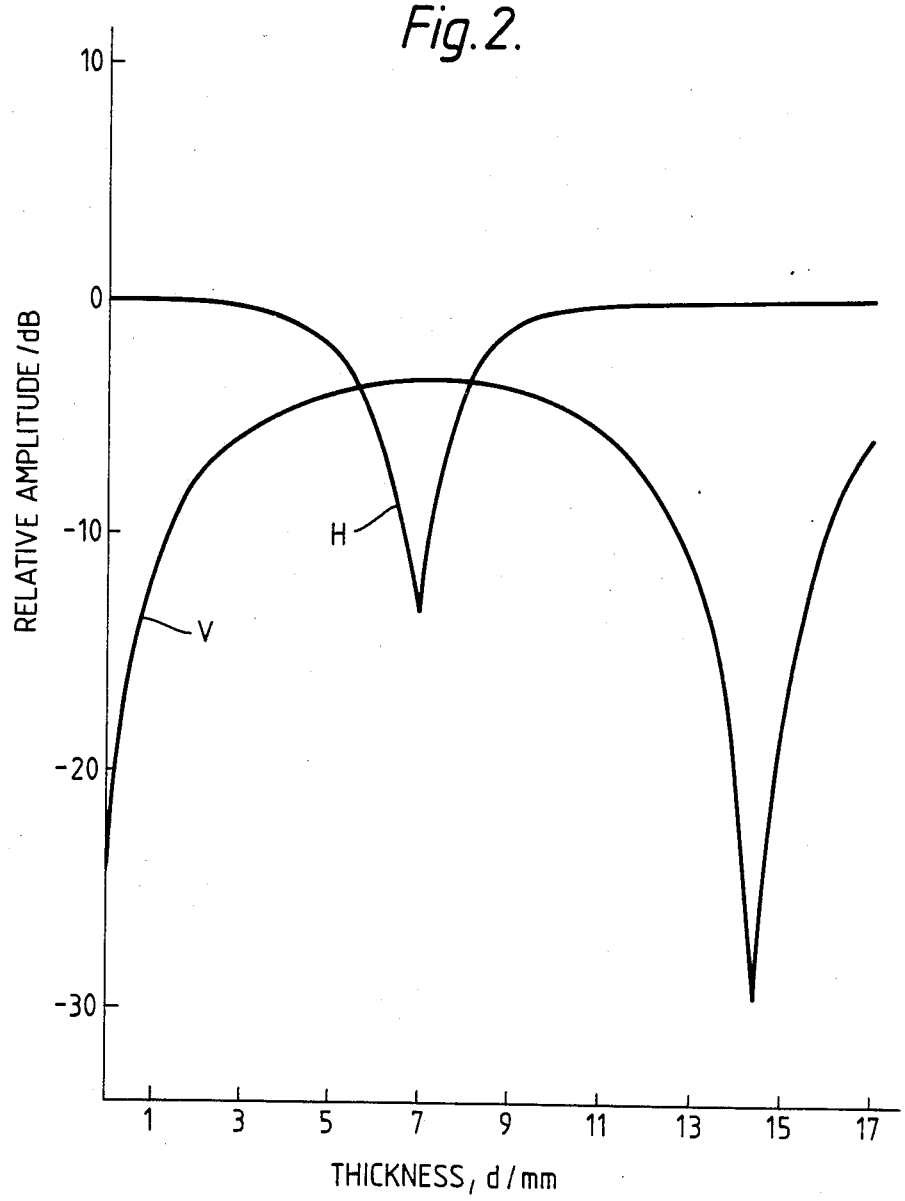
FIG. 2 represents graphically the variation of amplitude of the horizontally and vertically plane-polarized reflected microwaves as a function of the thickness of a kerosene layer, for the apparatus of FIG. 1.

Referring now to FIG. 2, this represents graphically the variation in amplitude of the vertically (V) and horizontally (H) polarized components of the reflected microwave beam in the apparatus of FIG. 1 with the thickness d of the kerosene layer 12, as determined by experiment. (It should be observed however that in operation of the apparatus of FIG. 1 these two components are not indicated separately.) The values of amplitude in each case are given relative to the amplitude of a horizontally polarized microwave beam reflected from pure water. With no kerosene on the water the vertically polarized component is about 24 dB less than the horizontally polarized component; complete cancellation is not achieved because the water is not a loss less dielectric and because of the divergence of the microwave beam, so that only a portion of the beam is incident exactly at the Brewster angle for an air/water interface.

As the kerosene layer thickness d increases there is an initial very rapid rise in the vertically polarized component. This occurs since the reflection from the upper, air-kerosene interface 15 no longer corresponds to the Brewster angle because of the different dielectric constant of kerosene. As the kerosene layer thickness increases further, the horizontally polarized component falls to a minimum value. This occurs because of interference between the waves reflected from the air-kerosene interface and the kerosene-water interface when the path difference is half a wavelength. Additional interference effects occur in both the horizontally and vertically polarized components at greater kerosene layer thicknesses.

The nulls occur out of phase in the two polarizations because of the phase changes which occur on reflection. For the horizontally polarized component, there is an approximately 180° phase change on reflection from the air-kerosene interface. Because the Brewster angle for the air-kerosene interface is less than the angle of reflection, there is almost no phase change on reflection of the vertically polarized component. At reflection from the kerosene-water interface both components undergo an approximately 180° phase change.

The measured initial rate of change of the vertically polarized component is 17 dB/mm of kerosene at a frequency of 11 GHz and the next null in the vertically polarized component occurs at a kerosene layer thickness d of 14.3 mm.

Referring now to FIG. 3, this represents graphically the variation in the polarization ratio, as determined by the unit 30 in the apparatus of FIG. 1, with the thickness d of the kerosene layer 12. It will be observed that the polarization ratio increases rapidly (at 17 dB/mm) for thin kerosene layers, so that the apparatus 10 of FIG. 1 is sensitive to such thin layers. Up to a thickness d of about 7 mm the polarization ratio increases continuously and so gives an unambiguous indication of the thickness. If the thickness exceeds that value the polarization ratio decreases, reaching a minimum for a thickness d of 14.3 mm, and then increasing again, the pattern repeating itself. Thus, at least for values of thickness d up to 7 mm, by use of the graph of FIG. 3 or an equivalent look-up table or inverse function, the unit 30 can readily determine the thickness d from the measured polarization ratio.

If the thickness d may exceed 7 mm then the thickness as determined from the polarization ratio is ambiguous. The true value may be determined by carrying out similar measurements using a different microwave frequency, and hence a different wavelength; for a different wavelength the general shape of the polarization ratio graph is as shown in FIG. 3 but the values of thickness d for the maxima and minima will be different. It will also be understood that the apparatus 10 of FIG. 1 might be used in conjunction with an ultrasonic liquid layer thickness gauge (not shown) when the thickness may exceed 7 mm, as for such thick layers as that ultrasonic gauges are suitable.

The apparatus 10 of FIG. 1 described above relies upon the amplitude changes which occur on reflection, in particular the change of amplitude of the vertically plane-polarized component. This amplitude change is very marked if the angle of incidence is equal to the Brewster angle for the water 14, and varies considerably with the thickness of the kerosene layer 12, the polarization ratio varying by over 30 dB as shown in FIG. 3. At other angles of incidence there is far less amplitude change: at 60° for example the polarization ratio only varies between about + and −3 dB. However in general there is also a phase shift, introduced by the reflection, between the vertically and horizontally polarized components. This phase difference depends upon the thickness of the layer, and varies between zero at normal incidence and 180° at grazing incidence (for pure water at the Brewster angle the phase change undergone by the vertically plane-polarized component is 90°). For a constant angle of incidence of for example 60° the phase difference varies cyclically with the layer thickness, as follows:

| thickness/mm: | 0 | 2 | 4 | 6 | 8 | 10 | 12 |
|---|---|---|---|---|---|---|---|
| phase difference/°: | −6 | −43 | −58 | +10 | +53 | +30 | −11 |

The phase difference may therefore be used as the basis of a method for measuring the layer thickness. Because the phase difference produced by such a reflection is generally not zero, an initially plane-polarized beam containing vertically and horizontally polarized components will generally become elliptically polarized after reflection.

An alternative apparatus (not shown) for monitoring the thickness of a layer of kerosene on water has similarities to the apparatus of FIG. 1, in having a transmitting horn connected by a coaxial cable to a signal generator which produces an 10 GHz signal, amplitude modulated by a 1 kHz square wave, the horn being arranged to transmit a beam of microwaves onto the exposed liquid surface with its plane of polarization at +45° to the vertical so that the incident beam has equal vertically and horizontally polarized components. The arrangement of the transmitting horn differs from that of FIG. 1 only in that the angle of incidence is 60°.

The apparatus differs further in having only one receiving horn arranged to receive microwaves reflected off the surface, and in that the receiving horn is arranged to receive microwaves polarized at −45° to the vertical, i.e. cross-polarized with respect to the incident beam. The receiving horn is connected by a coaxial cable and a crystal detector to an amplifier-and-signal-analysis unit. The amplitude of the received signal R would be zero if there were no phase difference introduced by the reflection, assuming the vertically and horizontally polarized components are of equal amplitude A (i.e. the polarization ratio=0 dB), and it depends upon the phase difference D as follows:

$$R^2 = A^2(1 - \cos D)$$

Since, as discussed above, the phase difference depends upon the thickness of the layer, the measurement of the amplitude of the received signal enables the layer thickness to be determined.

Referring to FIG. 4 there is represented graphically the variation in the received signal R with the thickness d of the kerosene layer; the values of the received signal are given relative to the signal that would be received if the horns were to point directly towards each other and have the same orientation. The variation in the received signal R is shown for an angle of incidence, i, of 60° as described above, and also for an angle of incidence, i, of 45°. In each case it will be observed that for values of thickness up to about 3 mm the received signal increases by several dB/mm, and so enables the thickness to be determined. For thicknesses greater than 3 mm there would be an ambiguity in the result, but as discussed earlier such an ambiguity could be resolved by the use of an alternative measuring technique such as ultrasound, or by using a different microwave frequency.

The above technique could also be utilized for determining the thickness of a dielectric layer on a surface of a metal substrate; the variation in received signal with layer thickness would be slightly different than that described above as no phase difference is created on reflection from a clean metal surface (i.e. when the layer thickness is zero).

Yet another alternative apparatus (not shown) for monitoring the thickness of a layer of organic liquid on water or for monitoring the thickness of a layer of a dielectric material on a surface of a metal substrate has considerable similarities to that of FIG. 1, differing only in that the angles of incidence and reflection are set at 60°, and in that no diodes are provided in the coaxial cables 26, and that the unit 30 is a network analyser (such as a Hewlett Packard 8510A) which can compare both the amplitudes and the phases of the signals received by the two horns 18 and 20.

On covering a clean metal surface with a thin dielectric layer, the polarization ratio has been found to change by a very small amount (typically less than 0.1 dB). The phase difference introduced is however readily measurable, and can be related to the layer thickness. For example a polyester film of thickness 25 micrometres has been found to produce a phase difference f about 1° at 15 GHz. Similarly, a sheet of paper of thickness about 0.1 mm has been found to produce a phase difference of about 3° at 15 GHz. This technique can also be used to measure the thickness of a layer of paint on a surface of a metal.

As mentioned above, this method is applicable to monitoring a layer of one liquid on another non-metallic liquid. Because the phase difference is monitored directly and in a manner unaffected by variations in amplitude of either component, this method is applicable at any angle of incidence, as long as the angle is not so large that microwaves can pass directly from the transmitter to the receivers without undergoing reflection.

We claim:

1. A method for monitoring a continuous layer of a non-metallic material of thickness greater than about 25 micrometers and less than about 10 mm on a surface of another non-metallic medium, the method comprising causing a polarized beam of microwaves to be incident on the exposed surface of the layer and so to be reflected from it at an angle of incidence greater than about 30°, the incident beam having a non-zero vertically plane-polarized component, and the angle of incidence being approximately equal to the Brewster angle for the other medium, and monitoring only one component of the reflected beam, said monitored component being the vertically plane-polarized component.

2. A method for monitoring a continuous layer of a non-metallic material of thickness greater than about 25 micrometers and less than about 10 mm on a surface of another medium, the method comprising causing a polarized beam of microwaves to be incident on the exposed surface of the layer and so to be reflected from it at an angle of incidence greater than about 30°, the incident beam having a non-zero vertically plane-polarized component and a non-zero horizontally plane-polarized component, and, if the other medium is non-metallic, the angle of incidence differing from the Brewster angle for the other medium by at least 5°, and monitoring only one component of the reflected beam, said monitored component being that component cross-polarized with respect to the incident beam.

3. A method for monitoring a continuous layer of a non-metallic material of thickness greater than about 25 micrometers and less than about 10 mm on a surface of another non-metallic medium, the method comprising causing a polarized beam of microwaves to be incident on the exposed surface of the layer and so to be reflected from it at an angle of incidence greater than about 30°, the incident beam having a non-zero vertically plane-polarized component and a non-zero horizontally plane-polarized component, and the angle of incidence being approximately equal to the Brewster angle for the other medium, monitoring both the vertically and the horizontally plane-polarized components of the reflected beam and determining only the ratio of the monitored components.

4. A method for monitoring a continuous layer of a non-metallic material of thickness greater than about 25 micrometers and less than about 10 mm on a surface of another medium, the method comprising causing a polarized beam of microwaves to be incident on the exposed surface of the layer and so to be reflected from it at an angle of incidence greater than about 30°, the incident beam having a non-zero vertically plane-polarized component and a non-zero horizontally plane-polarized component, monitoring both the vertically and the horizontally plane-polarized components of the reflected beam, and determining only the phase difference between the monitored components.

5. A method as claimed in claim 2 wherein the incident beam is plane-polarized at 45° to plane containing the incident beam and the normal to the surface.

6. A method as claimed in claim 2 wherein the angle of incidence is between about 45° and 70°.

7. A method as claimed in claim 1 also comprising modulating the microwave frequency to resolve any ambiguity in the monitored layer thickness.

8. A method as claimed in claim 2 also comprising modulating the microwave frequency to resolve any ambiguity in the monitored layer thickness.

9. A method as claimed in claim 3 also comprising modulating the microwave frequency to resolve any ambiguity in the monitored layer thickness.

10. A method as claimed in claim 4 also comprising modulating the microwave frequency to resolve any ambiguity in the monitored layer thickness.

11. An instrument for monitoring the thickness of a continuous layer of a non-metallic material of thickness greater than about 20 micrometers and less than about 10 mm on a surface of another medium, the apparatus comprising means for causing a beam of microwaves to be incident on the exposed surface of the layer and so to be reflected from it at an angle of incidence greater than about 30°, the incident beam having a non-zero vertically plane-polarized component, and means for monitoring at least one component of the reflected microwave beam polarized in a preset appropriate plane, and for determining therefrom the thickness of the layer, the monitored components and the parameter determined from them being predetermined in accordance with the nature of the other medium and the incident beam as set out in the following table:

| Other Medium | Angle of Incidence | Non-zero horizontally plane-polarized incident component | Monitored plane-polarized component(s) | Determine |
|---|---|---|---|---|
| non-metallic | Brewster | | Only vertical | Only amplitude |
| non-metallic | Brewster | Yes | Both vertical and horizontal | Only ratio |
| non-metallic | differ from Brewster by at least 5° | Yes | Only cross-polarized | Only amplitude |
| Metallic | any angle | Yes | Only cross-polarized | Only amplitude |
| Any | Any | Yes | Both vertical and horizontal | Only the phase difference |

* * * * *